(12) United States Patent
Ueno

(10) Patent No.: US 12,356,238 B2
(45) Date of Patent: Jul. 8, 2025

(54) TRAVELING APPARATUS

(71) Applicant: OMRON Corporation, Kyoto (JP)

(72) Inventor: Shinji Ueno, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 419 days.

(21) Appl. No.: 18/157,986

(22) Filed: Jan. 23, 2023

(65) Prior Publication Data

US 2023/0262511 A1 Aug. 17, 2023

(30) Foreign Application Priority Data

Feb. 15, 2022 (JP) ................................. 2022-021498

(51) Int. Cl.
*H04W 28/02* (2009.01)
*H04W 28/06* (2009.01)

(52) U.S. Cl.
CPC ....... *H04W 28/0236* (2013.01); *H04W 28/06* (2013.01)

(58) Field of Classification Search
CPC ... H04W 28/0236; H04W 28/06; H04W 4/02; H04W 4/021; G05D 1/0274; G05D 1/0297; G05D 1/0285; H04B 17/318
USPC ........................................................ 370/329
See application file for complete search history.

(56) References Cited

U.S. PATENT DOCUMENTS

| | | | | |
|---|---|---|---|---|
| 7,990,905 | B2 * | 8/2011 | Lappetelainen | H04B 7/155 455/452.2 |
| 9,216,508 | B2 * | 12/2015 | Ruuspakka | G05D 1/0217 |
| 9,824,589 | B1 * | 11/2017 | Ramirez | G08G 1/163 |
| 10,355,771 | B1 * | 7/2019 | Clark | H04B 1/1018 |
| 10,830,862 | B2 * | 11/2020 | Uchida | G01S 5/021 |
| 11,314,312 | B2 * | 4/2022 | Giusti | G01S 7/35 |
| 11,808,602 | B2 * | 11/2023 | Hossain | G01C 21/3859 |

(Continued)

FOREIGN PATENT DOCUMENTS

| | | | | |
|---|---|---|---|---|
| EP | 3540985 | A1 * | 9/2019 | ............... G08G 1/00 |
| EP | 3293538 | B1 * | 4/2022 | ............... G01S 5/02 |

(Continued)

OTHER PUBLICATIONS

Extended European Search Report issued in European Appln. No. 23153378.7, mailed Jul. 10, 2023.

*Primary Examiner* — Mahendra R Patel
(74) *Attorney, Agent, or Firm* — ROSSI, KIMMS & McDOWELL LLP

(57) ABSTRACT

A technique provides a coverage in response to any layout change. A travel controller in a traveling apparatus determines a travel route of a travel unit based on a first radio wave intensity being an intensity of a radio wave transmitted and received between a first radio wave transmitter-receptor and a first device, a first threshold, a second radio wave intensity being an intensity of a radio wave transmitted and received between a second radio wave transmitter-receptor and a second device, a second threshold, and a layout map showing a location of the first device and a location of the second device to maintain the first radio wave intensity at the first threshold or higher and to maintain the second radio wave intensity at the second threshold or higher. The travel controller controls travel of the travel unit based on the determined travel route.

15 Claims, 3 Drawing Sheets

(56) References Cited

U.S. PATENT DOCUMENTS

| | | | | |
|---|---|---|---|---|
| 11,999,589 B2 * | 6/2024 | Wedzikowski | .......... | B66B 1/468 |
| 2004/0143428 A1 * | 7/2004 | Rappaport | .............. | H04L 41/12 |
| | | | | 703/22 |
| 2007/0271011 A1 * | 11/2007 | Lee | ......................... | G05D 1/028 |
| | | | | 901/1 |
| 2008/0280565 A1 * | 11/2008 | Jevremovic | ........... | H04W 16/20 |
| | | | | 455/67.7 |
| 2013/0320212 A1 * | 12/2013 | Valentino | .............. | G01J 1/4204 |
| | | | | 250/336.1 |
| 2014/0207282 A1 * | 7/2014 | Angle | .................... | B25J 13/006 |
| | | | | 901/1 |
| 2015/0312774 A1 * | 10/2015 | Lau | ...................... | G05D 1/0274 |
| | | | | 455/446 |
| 2020/0252851 A1 * | 8/2020 | Tukmanov | ........ | H04W 36/08 |
| 2021/0250080 A1 * | 8/2021 | Suzuki | .................. | H04W 48/20 |
| 2022/0007216 A1 * | 1/2022 | Asada | ................... | H04B 17/318 |
| 2023/0251098 A1 * | 8/2023 | Yano | .................... | G01C 21/206 |
| | | | | 701/527 |

FOREIGN PATENT DOCUMENTS

| | | | | | |
|---|---|---|---|---|---|
| EP | 4258721 | A1 * | 10/2023 | ......... | G01C 21/3811 |
| JP | 2002171215 | A * | 6/2002 | | |
| JP | 2007243652 | A * | 9/2007 | | |
| JP | 2017032428 | A * | 2/2017 | | |
| WO | WO-2019034391 | A1 * | 2/2019 | ........... | G05D 1/0212 |
| WO | WO-2022219737 | A1 * | 10/2022 | ............ | H04W 16/10 |

* cited by examiner

TRAVELING APPARATUS

CROSS-REFERENCE TO RELATED APPLICATION

This application claims priority to Japanese Patent Application No. 2022-021498 filed on Feb. 15, 2022, the contents of which are incorporated herein by reference.

FIELD

The present invention relates to a traveling apparatus.

BACKGROUND

Devices, sensors, and controllers may communicate indoors through wired local area network (LAN) cables. However, such wired LAN cables physically fix a layout of devices and others to be less flexible and less responsive to changes. The use of a wireless system instead, such as Wi-Fi (registered trademark) or 5G, may be promising, but the wireless system may have lower quality communication in an environment with a lower radio wave intensity. Thus, before and after the layout change indoors, an appropriate coverage (range that radio waves reach) is to be provided near the wireless system. For example, Patent Literature 1 describes a technique for wireless communication between a base station and a mobile station through a relay station.

CITATION LIST

Patent Literature

Patent Literature 1: Japanese Unexamined Patent Application Publication No. 2002-171215

SUMMARY

Technical Problem

A person conducts an on-site investigation that is referred to as a site survey, and adjusts the location and the number of access points to avoid coverage holes (areas unreachable by radio waves) and interferences between the radio waves. A coverage may be provided using relays or mesh Wi-Fi (registered trademark). In this case, however, the coverage of the wireless system is fixed. The coverage may be provided using leaky coaxial cables. In this case, however, the coverage of the wireless system is fixed. The coverage may be provided using an unpowered relay device. However, the unpowered relay device is to avoid interferences with reflected waves from walls or floor surfaces and thus has difficulty in handling indoors. Any of these methods involves another site survey and adjustment of the location and the number of access points in response to a layout change.

In response to this, one or more aspects of the present invention are directed to a technique for providing a coverage in response to a layout change.

Solution to Problem

A traveling apparatus according to one aspect of the present invention includes a first radio wave transmitter-receptor that transmits and receives a radio wave to and from a first device, a second radio wave transmitter-receptor that transmits and receives a radio wave to and from a second device, a communication controller that controls communication between the first radio wave transmitter-receptor and the second radio wave transmitter-receptor to cause the second radio wave transmitter-receptor to transmit a radio wave to the second device in accordance with a radio wave transmitted from the first device and received by the first radio wave transmitter-receptor and to cause the first radio wave transmitter-receptor to transmit a radio wave to the first device in accordance with a radio wave transmitted from the second device and received by the second radio wave transmitter-receptor, a travel unit that travels, and a travel controller that controls travel of the travel unit. The travel controller determines a travel route of the travel unit based on a first radio wave intensity being an intensity of the radio wave transmitted and received between the first radio wave transmitter-receptor and the first device, a first threshold, a second radio wave intensity being an intensity of the radio wave transmitted and received between the second radio wave transmitter-receptor and the second device, a second threshold, and a layout map showing a location of the first device and a location of the second device to maintain the first radio wave intensity at the first threshold or higher and to maintain the second radio wave intensity at the second threshold or higher. The travel controller controls the travel of the travel unit based on the determined travel route.

When the first radio wave intensity is lower than the first threshold after the layout change, the travel route of the travel unit is determined to maintain the first radio wave intensity at the first threshold or higher, and the travel of the travel unit is controlled. When the second radio wave intensity is lower than the second threshold after the layout change, the travel route of the travel unit is determined to maintain the second radio wave intensity at the second threshold or higher, and the travel of the travel unit is controlled. The travel route of the travel unit is determined to maintain the second radio wave intensity at the second threshold or higher and the travel of the travel unit is controlled. This allows the traveling apparatus to move to a location that satisfies an appropriate radio wave intensity. This provides a coverage in response to any layout change.

In the above aspect of the present invention, the first radio wave transmitter-receptor may use a first wireless scheme to transmit and receive the radio wave to and from the first device. The second radio wave transmitter-receptor may use a second wireless scheme to transmit and receive the radio wave to and from the second device. The travel controller may determine the travel route based on the first radio wave intensity, the first threshold in accordance with a type of the first wireless scheme, the second radio wave intensity, the second threshold in accordance with a type of the second wireless scheme, and the layout map to maintain the first radio wave intensity at the first threshold in accordance with the type of the first wireless scheme or higher and to maintain the second radio wave intensity at the second threshold in accordance with the type of the second wireless scheme or higher. The travel controller may control the travel of the travel unit based on the determined travel route. The first threshold varies in accordance with the type of the first wireless scheme. Thus, the travel controller uses the first threshold in accordance with the type of the first wireless scheme to determine the travel route. The second threshold varies in accordance with the type of the second wireless scheme. Thus, the travel controller uses the second threshold in accordance with the type of the second wireless scheme to determine the travel route.

In the above aspect of the present invention, the first wireless scheme may be the same as the second wireless scheme. In the above aspect of the present invention, the first wireless scheme may be different from the second wireless scheme. In the above aspect of the present invention, a range in which a radio wave reaches in the first wireless scheme may be larger than a range in which a radio wave reaches in the second wireless scheme.

In the above aspect of the present invention, the second device may be one of a plurality of second devices. In the above aspect of the present invention, the first device may be a fixed station, and the second device may be a communication terminal.

Advantageous Effects

The technique according to the above aspects of the present invention provides a coverage in response to any layout change.

DETAILED DESCRIPTION

One or more embodiments will now be described with reference to the drawings. The embodiments described below are mere examples of the present invention and do not limit the scope of the claims of the present invention.

Example Use

Figure 1:
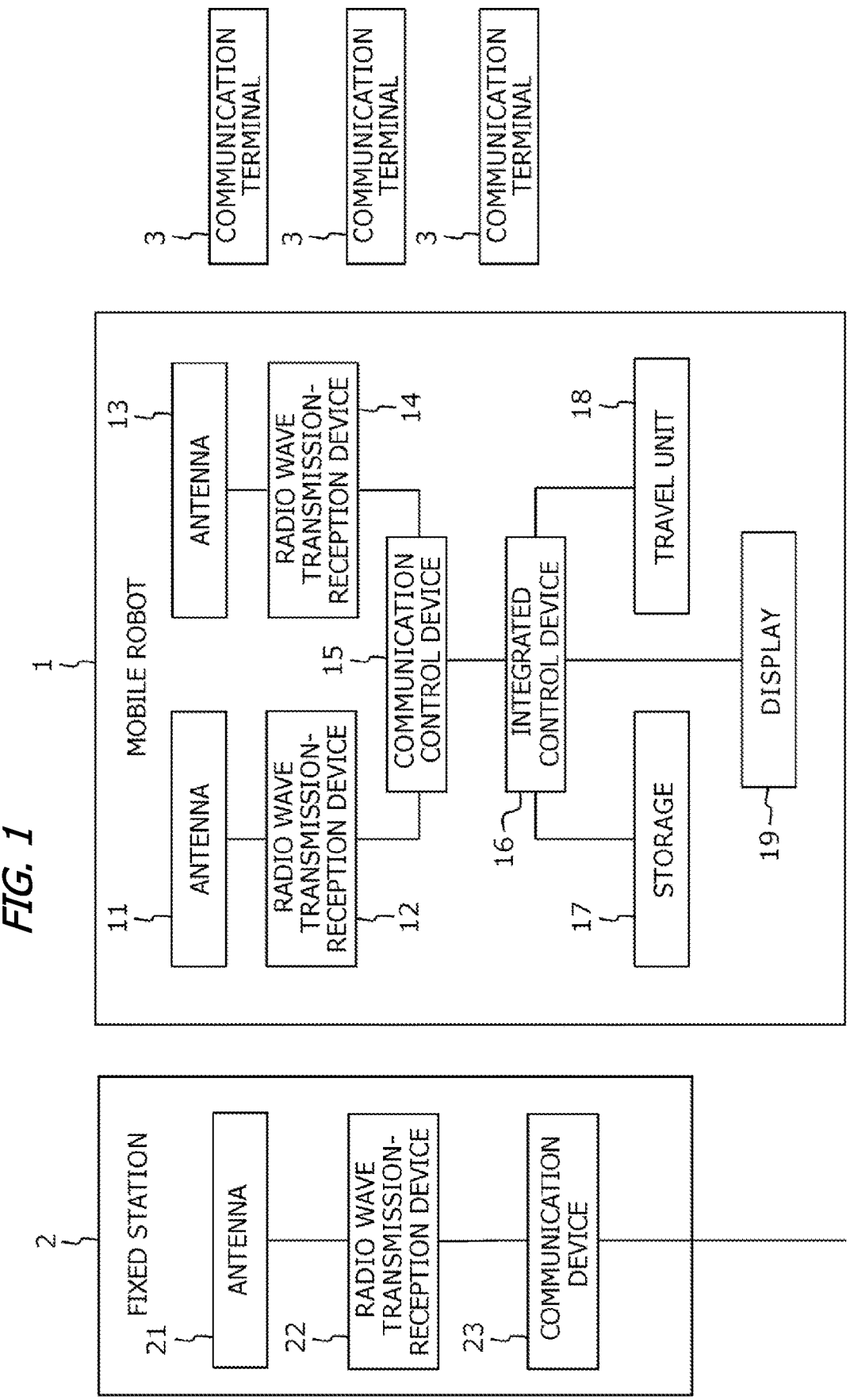
FIG. 1 is a block diagram of a communication system.

An example use of the present invention will now be described.
Overall Configuration of Communication System FIG. 1 is a block diagram of a communication system. The communication system includes a mobile robot 1, a fixed station 2, and multiple communication devices (terminal devices) 3. The mobile robot 1 is an unmanned vehicle traveling autonomously (autonomous traveling apparatus) or an unmanned carrier traveling autonomously (autonomous traveling carrier). The mobile robot 1 communicates wirelessly with the fixed station 2. Further, the mobile robot 1 communicates wirelessly with the communication terminals 3. The mobile robot 1 may communicate wirelessly with the multiple communication terminals 3 at the same time, or may communicate wirelessly with one of the multiple communication terminals 3. The structure in FIG. 1 includes three communication terminals 3 but may include any other number of communication terminals 3, such as one, two, or four or more.

The fixed station 2 includes an antenna 21, a radio wave transmission-reception device 22, and a communication device 23. The fixed station 2 is also referred to as an access point, a station, or a parent unit, and defines a coverage area that allows wireless communication. The coverage area may be referred to as a coverage or a cell. The fixed station 2 is located, for example, on a floor in a building. The fixed station 2 is an example of a first device. The fixed station 2 is connected to, for example, a server through a wired local area network (LAN). The communication terminal 3 is an information processing device with communication capabilities. The communication terminal 3 is, for example, a personal computer, a tablet, or a smartphone. The communication terminal 3 is an example of a second device.

The mobile robot 1 includes an antenna 11, a radio wave transmission-reception device 12, an antenna 13, a radio wave transmission-reception device 14, a communication control device 15, an integrated control device 16, a storage 17, a travel unit 18, and a display 19.

The radio wave transmission-reception device 12 transmits and receives a radio wave to and from the fixed station 2. To receive a radio wave from the radio wave transmission-reception device 22 and to transmit a radio wave to the radio wave transmission-reception device 22, the radio wave transmission-reception device 12 communicates wirelessly with the radio wave transmission-reception device 22 through the antenna 11 in a first wireless scheme (first wireless communication standard). The radio wave transmission-reception device 12 is an example of a first radio wave transmitter-receptor. The antenna 11 may be an omni-directional antenna. In some embodiments, the antenna 11 as an omni-directional antenna may be mounted on an upper part of the mobile robot 1. The antenna 11 may be mounted on an upper surface of a body of the mobile robot 1. The first wireless scheme is, for example, local 5G, private long term evolution (LTE), Wi-Fi (registered trademark), or Bluetooth (registered trademark). The radio wave transmission-reception device 12 measures a first radio wave intensity as an intensity of the radio wave transmitted to and received from the radio wave transmission-reception device 22.

To receive a radio wave from the radio wave transmission-reception device 12 and to transmit a radio wave to the radio wave transmission-reception device 12, the radio wave transmission-reception device 22 communicates wirelessly with the radio wave transmission-reception device 12 through the antenna 21 in the first wireless scheme.

The radio wave transmission-reception device 14 transmits and receives a radio wave to and from the communication terminal 3. To receive a radio wave from the communication terminal 3 and to transmit a radio wave to the communication terminal 3, the radio wave transmission-reception device 14 communicates wirelessly with the communication terminal 3 through the antenna 13 in a second wireless scheme (second wireless communication standard). The radio wave transmission-reception device 14 is an example of a second radio wave transmitter-receptor. The antenna 13 may be a directional antenna. The second wireless scheme is, for example, local 5G, private LTE, Wi-Fi (registered trademark), or Bluetooth (registered trademark). The radio wave transmission-reception device 14 measures a second radio wave intensity as an intensity of the radio wave transmitted to and received from the communication terminal 3.

To receive a radio wave from the radio wave transmission-reception device 14 and to transmit a radio wave to the radio wave transmission-reception device 14, the communication terminal 3 communicates wirelessly with the radio wave transmission-reception device 14 in the second wireless scheme.

The communication control device 15 controls the radio wave transmission-reception devices 12 and 14 to communicate wirelessly. The communication control device 15 is an example of a communication controller. The communication control device 15 may be, for example, a computer including a processor such as a central processing unit (CPU), a random-access memory (RAM), and a nonvolatile storage medium (e.g., a read-only memory or a ROM, or a flash memory). Any computer may be used. All or part of the functions provided by the communication control device 15 may be implemented by a circuit such as an application-specific integrated circuit (ASIC) or a field-programmable gate array (FPGA).

To cause the radio wave transmission-reception device 14 to transmit a radio wave to the communication terminal 3 in accordance with a radio wave transmitted from the fixed station 2 and received by the radio wave transmission-reception device 12, the communication control device 15 controls the radio wave transmission-reception devices 12 and 14. To cause the radio wave transmission-reception device 14 to transmit a radio wave to the communication terminal 3 in accordance with a radio wave transmitted from the fixed station 2 and received by the radio wave transmission-reception device 12, the communication control device 15 controls the radio wave transmission-reception devices 12 and 14.

The communication control device 15 relays data communication between the radio wave transmission-reception device 12 and the radio wave transmission-reception device 14. For example, to send a packet transmitted from the fixed station 2 to the communication terminal 3, the communication control device 15 controls the radio wave transmission-reception devices 12 and 14 based on information such as an address of the packet transmitted from the fixed station 2. For example, to send a packet transmitted from the communication terminal 3 to the fixed station 2, the communication control device 15 controls the radio wave transmission-reception devices 12 and 14 based on information such as an address of the packet transmitted from the communication terminal 3.

The integrated control device 16 controls an overall operation of the mobile robot 1. The integrated control device 16 may be, for example, a computer including the processor such as a CPU, a RAM, and a nonvolatile storage medium (e.g., a ROM or a flash memory). Any computer may be used. All or part of the functions provided by the communication control device 15 may be implemented by a circuit such as an ASIC or an FPGA. The storage 17 may be, for example, a RAM or a nonvolatile storage medium (e.g., a ROM or a flash memory).

The integrated control device 16 receives a command from an external device such as a host device, and controls travel of the travel unit 18 in accordance with the command. Thus, the travel unit 18 travels. The travel unit 18 travels, for example, on a road surface. The travel unit 18 travels on the road surface, causing the mobile robot 1 to travel on the road surface to move to a predetermined location.

The travel unit 18 includes multiple drive wheels (rotational unit). Each of the drive wheels includes a tire. The travel unit 18 travels while controlling forward and reverse rotation of the drive wheels located on the right and the left of the body of the mobile robot 1. The travel unit 18 includes various sensors such as a monitoring sensor to monitor the surroundings of the mobile robot 1 and an acceleration sensor to detect a travel state or a location of the mobile robot 1. The monitoring sensor is a range sensor such as a light detection and ranging (Lidar) sensor, and obtains data (distance image) showing a distance to an object located within a measurement range of the monitoring sensor. For example, when the monitoring sensor detects a person who has jumped into a passage, the integrated control device 16 controls the travel unit 18 to stop the travel or to avoid the person. Further, the integrated control device 16 calculates the location of the travel unit 18 on a map based on the data obtained by the various sensors such as the acceleration sensor. For example, the integrated control device 16 may estimate its location using a simultaneous localization and mapping (SLAM) technique to calculate the location of the travel unit 18 on the map. The display 19 displays various sets of data and information. The display 19 is, for example, a liquid crystal display, a plasma display, or an organic electroluminescent (EL) display. The integrated control device 16 controls the display 19 to display the various sets of data and information on the display 19.

The integrated control device 16 determines a travel route of the travel unit 18, and controls the travel of the travel unit 18 based on the travel route of the travel unit 18. The integrated control device 16 is an example of a travel controller. To maintain the first radio wave intensity at a first threshold or higher and to maintain the second radio wave intensity at a second threshold or higher, the integrated control device 16 determines the travel route of the travel unit 18 based on the first radio wave intensity, the first threshold, the second radio wave intensity, the second threshold, and a layout map showing the location of the fixed station 2 and the location of the communication terminal 3.

The layout map is stored in the storage 17. The layout map shows the location of the fixed station 2, the location of the communication terminal 3, and an area for the travel unit 18 to travel. In response to a change in the layout, the layout map stored in the storage 17 is updated. The change in the layout includes, for example, changes in locations of the fixed station 2, the communication terminal 3, and the positions of components such as walls or equipment. To update the layout map in the storage 17, the integrated control device 16 may obtain a layout map showing the change in the layout (a layout map after the layout change) and store the layout map after the layout change into the storage 17.

When the first radio wave intensity is lower than the first threshold after the layout change, the travel route of the travel unit 18 is determined to maintain the first radio wave intensity at the first threshold or higher, and the travel of the travel unit 18 is controlled. When the second radio wave intensity is lower than the second threshold after the layout change, the travel route of the travel unit 18 is determined to maintain the second radio wave intensity at the second threshold or higher, and the travel of the travel unit 18 is controlled. The travel route of the travel unit 18 is determined to maintain the first radio wave intensity at the first threshold or higher and to maintain the second radio wave intensity at the second threshold or higher, and the travel of the travel unit 18 is controlled. This allows the mobile robot 1 to move to a location that satisfies an appropriate radio wave intensity. This provides a coverage in response to any layout change.

The layout map may define a travel-permitted area (zone) that permits the travel unit 18 to travel and a travel-prohibited area (entry prohibited area) that prohibits the travel unit 18 from traveling. The travel-prohibited area includes, for example, moving flows of a person, equipment, and loading and unloading passages for workpieces. The integrated control device 16 determines the travel route of the travel unit 18 based on the layout map showing the travel-prohibited areas. This allows the travel unit 18 to avoid the travel-prohibited area while traveling.

Embodiments

Overall Configuration of Control System

Figure 2:
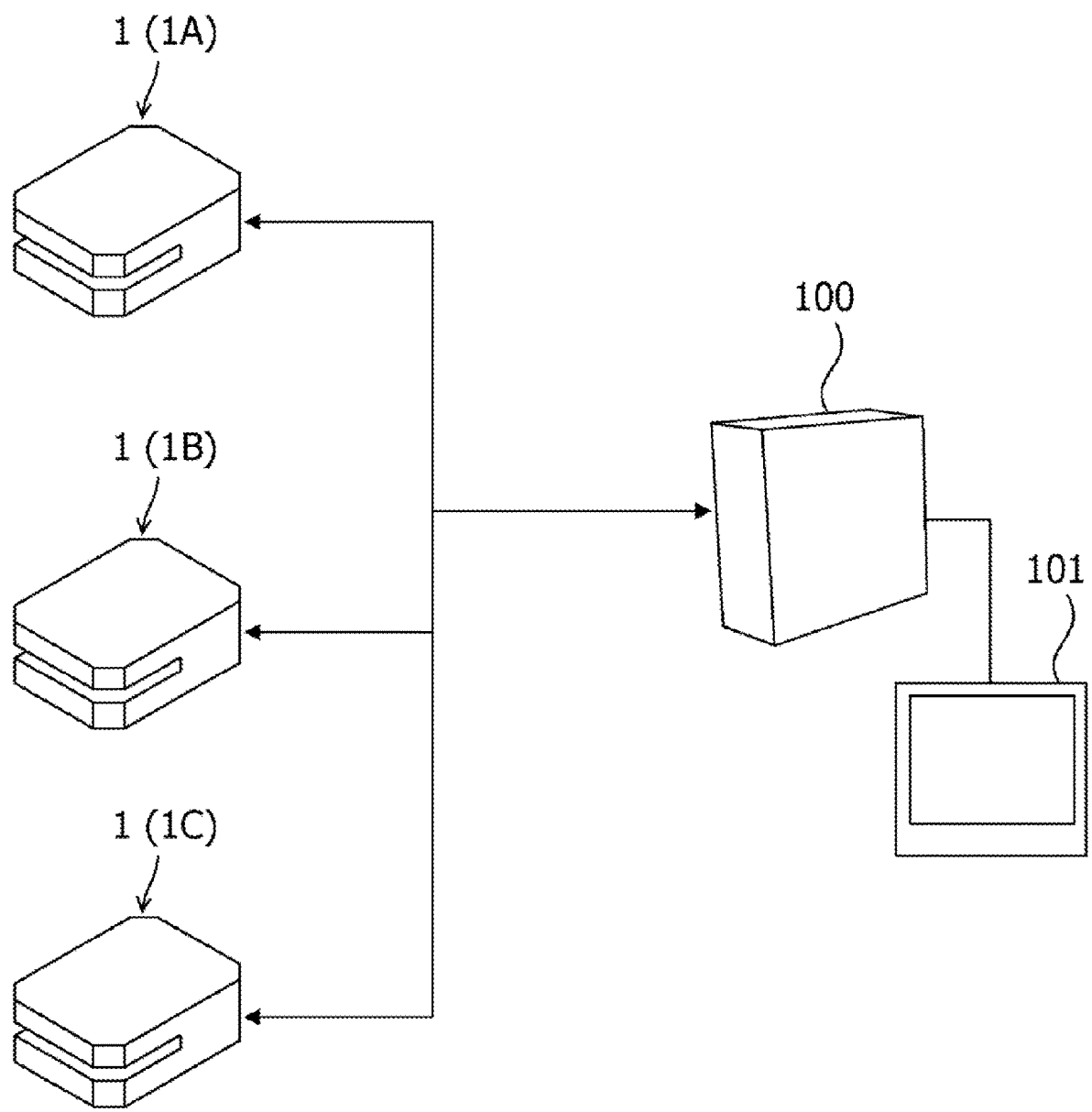
FIG. 2 is a schematic diagram of an example control system.

FIG. 2 is a schematic diagram of an example control system according to an embodiment. In FIG. 2, a host device 100 manages multiple mobile robots 1 (1A, 1B, and 1C). The host device 100 may manage any number of mobile robots 1. The structure in the example shown in FIG. 2 includes three mobile robots 1 but may have any other number of mobile robots 1, such as one, two, or four or more.

The host device 100 communicates with the multiple mobile robots 1, and provides a travel command and a conveyance command to the mobile robot 1 predetermined in the system managed by the host device 100. The host device 100 may communicate with the multiple mobile robots 1 through the fixed station 2. The host device 100 may be, for example, a server, a workstation, or a personal computer. The host device 100 includes a display 101 to display various sets of data and information. The display 101 may be, for example, a liquid crystal display, a plasma display, or an organic EL display. The host device 100 controls the display 101 to display the various sets of data and information on the display 101. The host device 100 may transmit the layout map to the multiple mobile robots 1. In response to any layout change, the host device 100 may transmit the layout map after the layout change to the multiple mobile robots 1.

The number of mobile robots 1 to the number of communication terminals 3 may be one to N or two to N. For example, when the number of mobile robots 1 to the number of communication terminals 3 is one to N, the number of mobile robots 1 may be increased to two to N. When the multiple communication terminals 3 are located in a large area, the number of mobile robots 1 to the number of communication terminals 3 may be M to N, with an increase in the number of mobile robots 1. The number of mobile robots 1 may be changed flexibly in accordance with the size of the area in which the multiple communication terminals 3 are installed. Further, the number of mobile robots 1 may be changed in accordance with the number of communication terminals 3.

Figure 3:
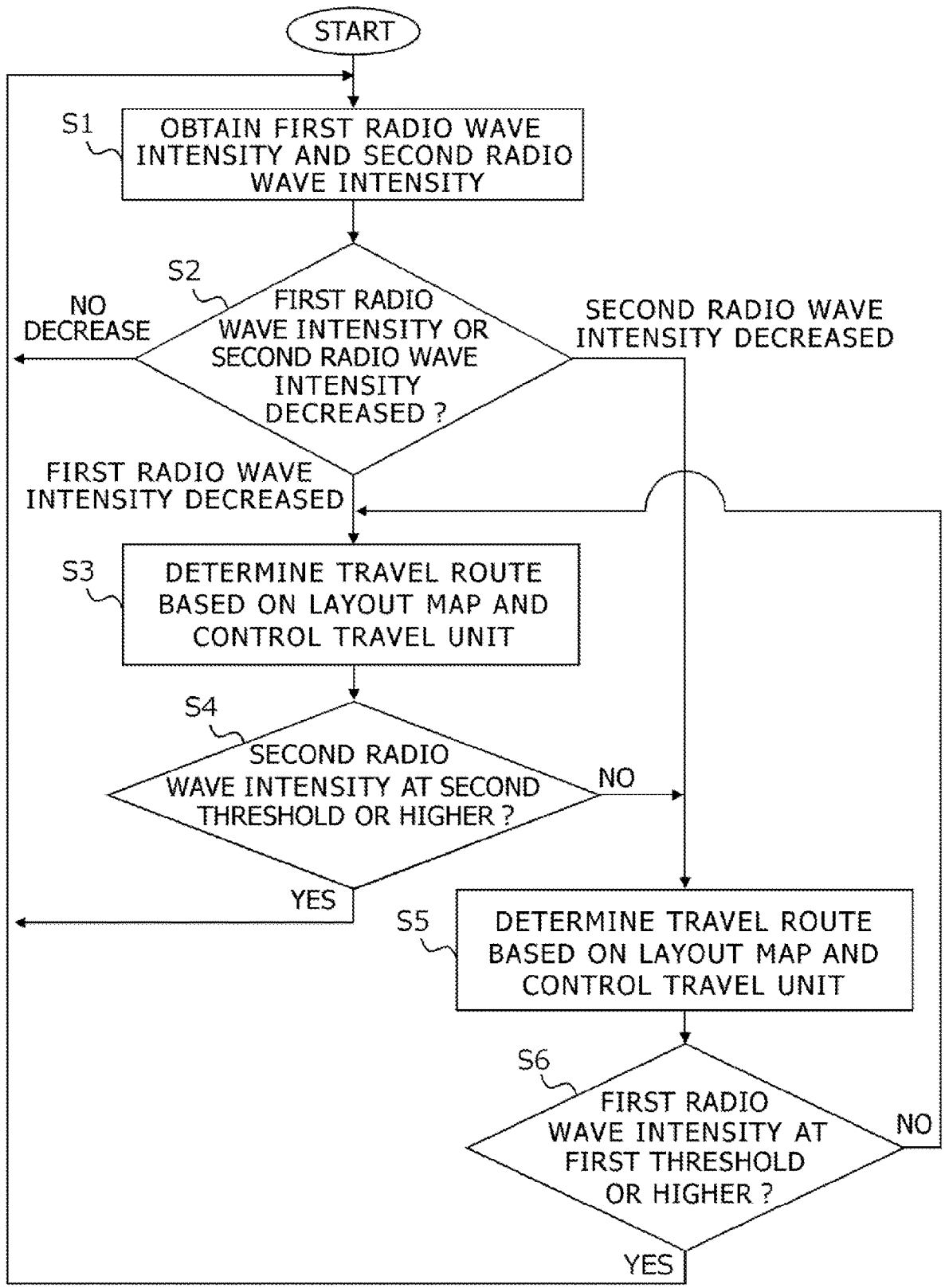
FIG. 3 is a flowchart of an operation example performed by a mobile robot.

FIG. 3 is a flowchart of an operation example performed by the mobile robot 1. When the flowchart starts in FIG. 3, the mobile robot 1 communicates wirelessly with the fixed station 2, and communicates wirelessly with the communication terminal 3. In step S1, the integrated control device 16 obtains the first radio wave intensity and the second radio wave intensity. The radio wave transmission-reception device 12 measures the first radio wave intensity at regular or irregular intervals. The radio wave transmission-reception device 14 measures the second radio wave intensity at regular or irregular intervals. The integrated control device 16 may obtain the first radio wave intensity from the radio wave transmission-reception device 12 and obtain the second radio wave intensity from the radio wave transmission-reception device 14 through the communication control device 15. The integrated control device 16 may obtain the first radio wave intensity and the second radio wave intensity at regular or irregular intervals. Further, the integrated control device 16 may obtain the first radio wave intensity and the second radio wave intensity in response to the command from the host device 100.

In step S2, the integrated control device 16 determines whether the first radio wave intensity or the second radio wave intensity has decreased. The integrated control device 16 compares the first radio wave intensity with the first threshold in accordance with a type of the first wireless scheme. When the first radio wave intensity is lower than the first threshold, the integrated control device 16 may determine that the first radio wave intensity has decreased. When the average of the first radio wave intensity per predetermined time interval is lower than the first threshold, the integrated control device 16 may determine that the first radio wave intensity has decreased. The first threshold varies in accordance with the type of the first wireless scheme. The first threshold is predetermined based on the design, experiments, or simulation, and is stored in the storage 17. The integrated control device 16 may compare the first radio wave intensity with the first threshold at regular or irregular intervals. When the first radio wave intensity has decreased, the processing advances to step S3.

The integrated control device 16 compares the second radio wave intensity with the second threshold in accordance with the type of the second wireless scheme. When the second radio wave intensity is lower than the second threshold, the integrated control device 16 may determine that the second radio wave intensity has decreased. When the average of the second radio wave intensity per predetermined time interval is lower than the second threshold, the integrated control device 16 may determine that the second radio wave intensity has decreased. The second threshold varies in accordance with the type of the second wireless scheme. The second threshold is predetermined based on the design, the experiments, or the simulation, and is stored in the storage 17. The integrated control device 16 may compare the second radio wave intensity with the second threshold at regular or irregular intervals. When the second radio wave intensity has decreased, the processing advances to step S5. When neither the first radio wave intensity nor the second radio wave intensity has decreased, the processing advances to step S1.

In step S3, the integrated control device 16 determines the travel route of the travel unit 18 based on the layout map, and controls the travel unit 18 to travel (move) based on the determined travel route. The travel route of the travel unit 18 includes the direction of the movement (traveling direction) in which the travel unit 18 moves. The direction of the movement in which the travel unit 18 moves may be a direction in which the travel unit 18 moves toward the fixed station 2. When an obstacle such as a wall is located between the mobile robot 1 and the fixed station 2, the direction of the movement in which the travel unit 18 moves may be a direction in which the travel unit 18 moves away from the obstacle.

In response to the first radio wave intensity being at the first threshold or higher, the integrated control device 16 controls the travel unit 18 to stop the travel. The integrated control device 16 may control the travel unit 18 to stop the travel in response to the average of the first radio wave intensity per predetermined time interval being at the first threshold or higher. To maintain the first radio wave intensity at the first threshold or higher, the integrated control device 16 determines the travel route of the travel unit 18 based on the first radio wave intensity, the first threshold, and the layout map, and controls the travel of the travel unit 18 based on the determined travel route.

In step S4, the integrated control device 16 determines whether the second radio wave intensity is at the second threshold or higher. When the second radio wave intensity is at the second threshold or higher, the processing advances to step S1. When the second radio wave intensity is lower than the second threshold, the processing advances to step S5.

In step S5, the integrated control device 16 determines the travel route of the travel unit 18 based on the layout map, and controls the travel unit 18 to travel based on the determined travel route. The travel route of the travel unit 18 includes the direction of the movement (traveling direction) in which the travel unit 18 moves. The direction of the movement in which the travel unit 18 moves may be a direction in which the travel unit 18 moves toward the communication terminal 3. When an obstacle such as the wall is located between the mobile robot 1 and the communication terminal 3, the direction of the movement in which the travel unit 18 moves may be a direction in which the travel unit 18 moves away from the obstacle.

The integrated control device 16 may determine a travel destination of the mobile robot 1 in accordance with the characteristics of the first wireless scheme and information included in the layout map. For example, when a range in which the radio wave reaches in the first wireless scheme is larger than the area for the travel unit 18 to travel, an area near the location of the communication terminal 3 may be determined as the travel destination of the mobile robot 1. The integrated control device 16 may determine the travel route of the travel unit 18 based on the travel destination of the mobile robot 1, and may control the travel unit 18 to travel based on the determined travel route.

In response to the second radio wave intensity being at the second threshold or higher, the integrated control device 16 controls the travel unit 18 to stop the travel. The integrated control device 16 may control the travel unit 18 to stop the travel in response to the average of the second radio wave intensity per predetermined time interval being at the second threshold or higher. To maintain the second radio wave intensity at the second threshold or higher, the integrated control device 16 determines the travel route of the travel unit 18 based on the second radio wave intensity, the second threshold, and the layout map, and controls the travel of the travel unit 18 based on the determined travel route.

In step S6, the integrated control device 16 determines whether the first radio wave intensity is at the first threshold or higher. When the first radio wave intensity is at the first threshold or higher, the processing advances to step S1. When the first radio wave intensity is lower than the first threshold, the processing advances to step S3.

To maintain the first radio wave intensity at the first threshold or higher and to maintain the second radio wave intensity at the second threshold or higher, the integrated control device 16 determines the travel route of the travel unit 18 based on the first radio wave intensity, the first threshold, the second radio wave intensity, the second threshold, and the layout map, and controls the travel of the travel unit 18 based on the determined travel route. This allows the mobile robot 1 to move to a location that satisfies an appropriate radio wave intensity, and provides a coverage in response to any layout change. The mobile robot 1 automatically moves while searching the location that satisfies the appropriate radio wave intensity. The coverage area (wireless coverage area) changes. This allows the communication terminal 3 to obtain the radio wave intended for a production line at any location, and reduces the restrictions on the layout due to the LAN cables.

The first wireless scheme may be the same as the second wireless scheme, or may be different from the second wireless scheme. The type of the first wireless scheme and the type of the second wireless scheme may be dynamically changed for the production line. The type of the first wireless scheme and the type of the second wireless scheme may be selected in accordance with applications, such as application for a wide area communication or for last mile communication as the final leg of the communication connection. The first wireless scheme may be used for the wide area communication or a medium area communication, and the second wireless scheme may be used for a narrow area communication. In this case, the range in which the radio wave reaches in the first wireless scheme is larger than a range in which the radio wave reaches in the second wireless scheme.

The first wireless scheme may be a licensed wireless system or may be an unlicensed wireless system. The second wireless scheme may be a licensed wireless system or may be an unlicensed wireless system. For example, the first wireless scheme may be a licensed wireless system, and the second wireless scheme may be an unlicensed wireless system. In this case, the location of the communication terminal 3 is changed to finely adjust the coverage area independently of the radio wave regulations related to the license. This will reduce the labor costs of reapplications for the license.

For example, the first wireless scheme may be local 5G or private LTE, and the second wireless scheme may be Wi-Fi (registered trademark) or Bluetooth (registered trademark). In this case, Wi-Fi (registered trademark) or Bluetooth (registered trademark) used at an existing facility is to be continuously used at a facility at which local 5G or private LTE is newly introduced. This reduces the investment costs of new equipment.

The mobile robot 1 automatically moves while searching the location that satisfies the appropriate radio wave intensity. This eliminates a site survey. Further, this reduces person-hours and expenses involved in a site survey.

The display 19 may display at least the information about the first radio wave intensity or the information about the second radio wave intensity. This allows a user to check at least the information about the first radio wave intensity or the information about the second radio wave intensity on the display 19. The information about the first radio wave intensity may include at least one of letters, numerals, symbols, letter strings, numeric strings, pictograms, graphs, or time charts. The information about the second radio wave intensity may include at least one of letters, numerals, symbols, letter strings, numeric strings, pictograms, graphs, or time charts. The integrated control device 16 may transmit the information about the first radio wave intensity and the information about the second radio wave intensity to the host device 100. The host device 100 may display at least the information about the first radio wave intensity or the information about the second radio wave intensity on the display 101. This allows the user to check at least the information about the first radio wave intensity or the information about the second radio wave intensity on the display 101.

The information about the first radio wave intensity may include a layout map on which a heat map is superimposed. Upon obtaining the first radio wave intensity from the radio wave transmission-reception device 12, the integrated control device 16 may calculate the location of the travel unit 18 on the layout map. While the mobile robot 1 is moving, the integrated control device 16 may obtain the first radio wave intensity and calculate the location of the travel unit 18 on the layout map. The integrated control device 16 may superimpose (add) a first heat map on the layout map based on the first radio wave intensity and the location of the travel unit 18 on the layout map. The first heat map shows the distribution of the first radio wave intensity. The first heat map visualizes the distribution of the first radio wave intensity in colors and shades. The display 19 may display the layout map on which the first heat map is superimposed. The integrated control device 16 may transmit, to the host device 100, the layout map on which the first heat map is superimposed. The display 101 may display the layout map on which the first heat map is superimposed. The user visually recognizes the layout map on which the first heat map is superimposed. This allows the user to check the distribution of the first radio wave intensity on the layout map.

The information about the second radio wave intensity may include a layout map on which the heat map is superimposed. Upon obtaining the second radio wave intensity from the radio wave transmission-reception device 14, the integrated control device 16 may calculate the location of the travel unit 18 on the layout map. While the mobile robot 1 is moving, the integrated control device 16 may obtain the second radio wave intensity and calculate the location of the travel unit 18 on the layout map. The integrated control device 16 may superimpose (add) a second heat map on the layout map based on the second radio wave intensity and the location of the travel unit 18 on the layout map. The second heat map shows the distribution of the second radio wave intensity. The second heat map visualizes the distribution of the second radio wave intensity in colors and shades. The display 19 may display the layout map on which the second heat map is superimposed. The integrated control device 16 may superimpose the first heat map and the second heat map on the layout map. The display 19 may display the layout map on which the first heat map and the second heat map are superimposed. The integrated control device 16 may transmit, to the host device 100, the layout map on which the second heat map is superimposed. The display 101 may display the layout map on which the second heat map is superimposed. The integrated control device 16 may transmit, to the host device 100, the layout map on which the first heat map and the second heat map are superimposed. The display 101 may display the layout map on which the first heat map and the second heat map are superimposed. The user visually recognizes the layout map on which the second heat map is superimposed. This allows the user to check the distribution of the second radio wave intensity on the layout map.

The processes described above may be a method implementable by a computer. A program for causing a computer to perform the processes described above may be provided to a computer through a network or with, for example, a computer-readable recording medium that stores data in a non-transitory manner.

APPENDIX

A traveling apparatus (1), comprising:
a first radio wave transmitter-receptor (12) configured to transmit and receive a radio wave to and from a first device (2);
a second radio wave transmitter-receptor (14) configured to transmit and receive a radio wave to and from a second device (3);
a communication controller (15) configured to control communication between the first radio wave transmitter-receptor and the second radio wave transmitter-receptor to cause the second radio wave transmitter-receptor to transmit a radio wave to the second device in accordance with a radio wave transmitted from the first device (2) and received by the first radio wave transmitter-receptor and to cause the first radio wave transmitter-receptor to transmit a radio wave to the first device (2) in accordance with a radio wave transmitted from the second device and received by the second radio wave transmitter-receptor;
a travel unit (18) configured to travel; and
a travel controller (16) configured to control travel of the travel unit,
wherein the travel controller (16) determines a travel route of the travel unit (18) based on a first radio wave intensity being an intensity of the radio wave transmitted and received between the first radio wave transmitter-receptor and the first device (2), a second radio wave intensity being an intensity of the radio wave transmitted and received between the second radio wave transmitter-receptor and the second device (3), and a layout map showing a location of the first device (2) and a location of the second device (3) to maintain the first radio wave intensity at the first threshold or higher and to maintain the second radio wave intensity at the second threshold or higher, and controls the travel of the travel unit (18) based on the determined travel route.

REFERENCE SIGNS LIST

1 mobile robot
2 fixed station
3 communication terminal
11, 21 antenna
12, 14, 22 radio wave transmission-reception device
13 antenna
15 communication control device
16 integrated control device
17 storage
18 travel unit
19, 101 display
23 communication device
100 host device

What is claimed is:
1. A traveling apparatus, comprising:
a first radio wave transmitter-receptor configured to transmit and receive a radio wave to and from a first device;
a second radio wave transmitter-receptor configured to transmit and receive a radio wave to and from a second device;
a communication controller configured to control communication between the first radio wave transmitter-receptor and the second radio wave transmitter-receptor to cause the second radio wave transmitter-receptor to transmit a radio wave to the second device in accordance with a radio wave transmitted from the first device and received by the first radio wave transmitter-receptor and to cause the first radio wave transmitter-receptor to transmit a radio wave to the first device in accordance with a radio wave transmitted from the second device and received by the second radio wave transmitter-receptor;
a travel unit configured to travel; and
a travel controller configured to control travel of the travel unit,
wherein the travel controller determines a travel route of the travel unit based on a first radio wave intensity being an intensity of the radio wave transmitted and received between the first radio wave transmitter-receptor and the first device, a first threshold, a second radio wave intensity being an intensity of the radio wave transmitted and received between the second radio wave transmitter-receptor and the second device, a second threshold, and a layout map showing a location of the first device and a location of the second device to maintain the first radio wave intensity at the first threshold or higher and to maintain the second radio wave intensity at the second threshold or higher, and controls the travel of the travel unit based on the determined travel route.

2. The traveling apparatus according to claim 1, wherein the first radio wave transmitter-receptor uses a first wireless scheme to transmit and receive the radio wave to and from the first device, the second radio wave transmitter-receptor uses a second wireless scheme to transmit and receive the radio wave to and from the second device, and the travel controller determines the travel route based on the first radio wave intensity, the first threshold in accordance with a type of the first wireless scheme, the second radio wave intensity, the second threshold in accordance with a type of the second wireless scheme, and the layout map to maintain the first radio wave intensity at the first threshold in accordance with the type of the first wireless scheme or higher and to maintain the second radio wave intensity at the second threshold in accordance with the type of the second wireless scheme or higher, and controls the travel of the travel unit based on the determined travel route.

3. The traveling apparatus according to claim 2, wherein the first wireless scheme is the same as the second wireless scheme.

4. The traveling apparatus according to claim 2, wherein the first wireless scheme is different from the second wireless scheme.

5. The traveling apparatus according to claim 4, wherein a range in which a radio wave reaches in the first wireless scheme is larger than a range in which a radio wave reaches in the second wireless scheme.

6. The traveling apparatus according to claim 1, wherein the second device is one of a plurality of second devices.

7. The traveling apparatus according to claim 1, wherein the first device is a fixed station, and the second device is a communication terminal.

8. The traveling apparatus according to claim 1, further comprising:

a display configured to display at least one of information about the first radio wave intensity or information about the second radio wave intensity.

9. The traveling apparatus according to claim 2, further comprising:

a display configured to display at least one of information about the first radio wave intensity or information about the second radio wave intensity.

10. The traveling apparatus according to claim 8, wherein the travel controller calculates a location of the travel unit on the layout map upon obtaining the first radio wave intensity, and superimposes a first heat map showing a distribution of the first radio wave intensity on the layout map based on the first radio wave intensity and the location of the travel unit on the layout map, and the display displays the layout map on which the first heat map is superimposed.

11. The traveling apparatus according to claim 9, wherein the travel controller calculates a location of the travel unit on the layout map upon obtaining the first radio wave intensity, and superimposes a first heat map showing a distribution of the first radio wave intensity on the layout map based on the first radio wave intensity and the location of the travel unit on the layout map, and the display displays the layout map on which the first heat map is superimposed.

12. The traveling apparatus according to claim 8, wherein the travel controller calculates a location of the travel unit on the layout map upon obtaining the second radio wave intensity, and superimposes a second heat map showing a distribution of the second radio wave intensity on the layout map based on the second radio wave intensity and the location of the travel unit on the layout map, and the display displays the layout map on which the second heat map is superimposed.

13. The traveling apparatus according to claim 9, wherein the travel controller calculates a location of the travel unit on the layout map upon obtaining the second radio wave intensity, and superimposes a second heat map showing a distribution of the second radio wave intensity on the layout map based on the second radio wave intensity and the location of the travel unit on the layout map, and the display displays the layout map on which the second heat map is superimposed.

14. The traveling apparatus according to claim 10, wherein the travel controller calculates a location of the travel unit on the layout map upon obtaining the second radio wave intensity, and superimposes a second heat map showing a distribution of the second radio wave intensity on the layout map based on the second radio wave intensity and the location of the travel unit on the layout map, and the display displays the layout map on which the second heat map is superimposed.

15. The traveling apparatus according to claim 11, wherein the travel controller calculates a location of the travel unit on the layout map upon obtaining the second radio wave intensity, and superimposes a second heat map showing a distribution of the second radio wave intensity on the layout map based on the second radio wave intensity and the location of the travel unit on the layout map, and the display displays the layout map on which the second heat map is superimposed.

* * * * *